United States Patent Office 3,265,693
Patented August 9, 1966

---

3,265,693
3-PHENYL-4-DIALKYLAMINOALKYLAMINO-CINNOLINES
Harman S. Lowrie, Glenview, Ill., assignor to G. D. Searle & Co., Chicago, Ill., a corporation of Delaware
No Drawing. Filed July 13, 1964, Ser. No. 382,366
9 Claims. (Cl. 260—247.5)

This application is a continuation-in-part of my copending application Serial No. 291,250, filed June 28, 1963, now Patent No. 3,167,552.

The present invention relates to a group of substituted 3-phenylcinnolines. More particularly, it relates to a group of compounds which can be represented by the following general formula

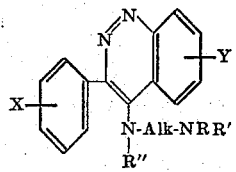

wherein Alk is a lower alkylene group separating the nitrogens attached thereto by at least 2 carbon atoms; —NRR' is selected from the group consisting of amino, di(lower alkyl)amino, 1-pyrrolidinyl, piperidino, morpholino, and 4-methyl-1-piperazinyl; R" is selected from the group consisting of hydrogen and methyl; and X and Y are selected from the group consisting of hydrogen, halogen, lower alkyl and lower alkoxy.

The lower alkylene radicals referred to above contain up to 6 carbon atoms and can be exemplified by ethylene, propylene, trimethylene, 1,4-pentylene, and similar divalent radicals. The lower alkyl radicals referred to above contain up to 6 carbon atoms and can be exemplified by methyl, ethyl, propyl, isopropyl, butyl, hexyl, and the like. The lower alkoxy radicals referred to above likewise contain up to 6 carbon atoms and can be exemplified by methoxy and ethoxy. The halogen radicals referred to above include fluorine, chlorine, bromine and iodine.

The organic bases of this invention form pharmaceutically acceptable salts with a variety of inorganic and strong organic acids including sulfuric, phosphoric, hydrochloric, hydrobromic, sulfamic, citric, ascorbic, and related acids.

The compounds of the present invention are conveniently prepared from the reaction of a 4-chlorocinnoline of the formula

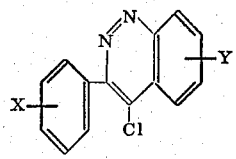

wherein X and Y are defined as above with the appropriately substituted alkylene diamine. Copper powder is used to promote the reaction which is carried out with heating either in an inert solvent or in an excess of the diamine reactant. Dimethyl sulfoxide is a particularly good solvent for use in carrying out the reaction but copper powder is unnecessary when this solvent is used.

Two processes are available for the preparation of the intermediate 4-chlorocinnolines referred to above. One such known procedure involves the reaction of an appropriate 3-substituted-4-hydroxycinnoline with phosphorus oxychloride to give the corresponding 4-chloro compound. Several procedures are available for the preparation of the 4-hydroxy compounds referred to above although a particularly useful method, involving the treatment of a cinnoline-4-carboxylic acid with copper and/or copper oxide in potassium hydroxide, is described in my copending application Serial No. 291,250, filed June 28, 1963, now Patent No. 3,167,552.

An alternate approach makes use of cinnoline N-oxides as intermediates. In this procedure, a 3-phenylcinnoline is oxidized to a mixture of N-oxides. Various agents such as 30% hydrogen peroxide in acetic acid and peracids can be used in this process. 3-chloroperbenzoic acid is particularly useful since it gives an excellent yield of a mixture of the two possible oxides in which the 1-oxide is the chief product obtained. The mixture of 1-oxide and 2-oxide can be separated by chromatography although this is not necessary since such a mixture can be treated directly with phosphorus oxychloride to give the 4-chlorocinnoline. Each of the purified oxides can also be converted to the corresponding 4-chloro compound under essentially the same conditions. In all cases, the yield of chloro compound obtained is excellent.

The compounds of this invention possess valuable pharmacological properties. In particular, they possess anti-hypertensive activity. In addition, they possess antibiotic activity against a variety of organisms. Thus, they inhibit the growth of bacteria such as *Diplococcus pneumoniae*, protozoa such as *Tetrahymena gelleii*, fungi such as *Candida albicans*, and algae such as *Chlorella vulgaris*. They also inhibit the germination of seeds of Trifolium.

The following examples are presented to further illustrate the present invention; they should not be construed as limiting it in spirit or in scope. In these examples, quantities are in parts by weight unless parts by volume are indicated and temperatures in degrees centrigrade (° C.). The relationship between parts by weight and parts by volume is the same as that between grams and milliliters.

*Example 1*

A solution of 120 parts of 4-chlorobenzaldehyde phenylhydrazone in 1070 parts of methylene chloride is added portionwise with stirring to a refluxing solution of 76 parts of oxalyl chloride in 1600 parts of methylene chloride. Stirring and refluxing are continued for about 2 hours after hydrogen chloride evolution stops. Then, 228 parts of aluminum chloride is added portionwise and stirring is continued at room temperature for 15 hours. The resultant dark red reaction mixture is poured into 4000 parts by volume of ice and water and the resultant mixture is diluted with methylene chloride to a volume of 11,000 parts. The organic layer is separated and then washed twice with 10% hydrogen chloride and once with water. The methylene chloride solution is dried over sodium sulfate and concentrated under reduced pressure. The solid which precipitates is separated by filtration and recrystallized from ethanol to give N-(4-chlorobenzylideneamino)isatin melting at about 237–238° C. This compound has the following formula

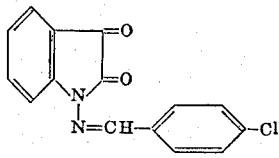

5 parts of the isatin obtained in the above reaction is refluxed for about 15 minutes in about 100 parts by volume of 50% potassium hydroxide solution. The resultant suspension is diluted to 500 parts by volume with boiling water and treated with charcoal. The filtered solution is then acidified to a pH of 4 with concentrated hydrochloric acid. The resultant mixture is cooled and the white powder which forms is filtered off and dried. The product thus obtained is recrystallized from acetone to give 3-(4- chlorophenyl)cinnoline-4-carboxylic acid melting at about 210–211° C.

100 parts of 3-(4-chlorophenyl)cinnoline-4-carboxylic acid is slowly heated to 260° C. by means of an oil bath. Gas is evolved and when the evolution stops, the resultant liquid is cooled and crystallized from a mixture of acetone and heptane to give yellow needles of 3-(4-chlorophenyl)cinnoline melting at about 146.5–147.5° C.

To a solution of 61.5 parts of 3-(4-chlorophenyl)cinnoline in 2000 parts of methylene chloride there is added 55 parts of 85% assay 3-chloroperbenzoic acid. The resultant solution becomes slightly warm from the heat of reaction but, otherwise, it is allowed to stand at room temperature for 17 hours. The mixture is washed with dilute sodium hydroxide solution and dried, and the solvent is evaporated. The resultant residue is a mixture of the 1- and 2-oxides and is sufficiently pure for conversion to the 4-chloro compound. However, recrystallization of the material from benzene gives fairly pure 3-(4-chlorophenyl)cinnoline-1-oxide melting at about 173–181° C.

The mixture of oxides obtained in the preceding paragraph is dissolved in 333 parts of phosphorus oxychloride and refluxed for 3 hours. Volatile materials are evaporated from the solution under reduced pressure and the residue, as a solution in methylene chloride, is poured onto a mixture of ice, dilute potassium hydroxide, and ammonium hydroxide, and allowed to stand for about 3 hours with occasional shaking. The chloroform layer is then separated and dried, the solvent is evaporated, and the resultant residue is crystallized from acetone to give 4-chloro-3-(4-chlorophenyl)cinnoline melting at about 138–140° C. This compound has the following formula

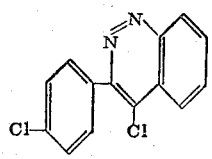

Example 2

The procedure described in Example 1 is repeated using using anisaldehyde phenylhydrazone as the starting material. In the course of the reaction sequence there is obtained N-(4-methoxybenzylideneamino)isatin melting at about 173–175° C. after recrystallization from ether; 3-(4-methoxyphenyl)cinnoline-4-carboxylic acid melting at about 249–250° C. after recrystallization from acetic acid; 3-(4-methoxyphenyl) cinnoline melting at about 111–112° C. after recrystallization from ether; a mixture of 3-(4-methoxyphenyl)cinnoline 1-oxide and 2-oxide (predominantly the 1-oxide) melting at about 165—170° C. after recrystallization from ethanol; and 4-chloro-3-(4-methoxyphenyl)cinnoline melting at about 130–131° C. after recrystallization from hexane.

Example 3

The procedure described in Example 1 is repeated starting with benzaldehyde phenylhydrazone. The mixture of 3-phenylcinnoline 1-oxide and 3-phenylcinnoline 2-oxide obtained from the oxidation of 3-phenylcinnoline with 3-chloroperbenzoic acid can be separated by chromatography on alumina. The 1-oxide, which is the principal product, is obtained as yellow needles melting at about 138–139° C. after recrystallization from methanol. The ultra violet spectrum of this compound in methanol shows absorption maxima of 9600 (316 mμ) and 9900 (326 mμ).

The pure 2-oxide melts at about 181–182° C. after recrystallization from a mixture of methylene chloride and hexane. The ultraviolet spectrum of this compound in methanol shows absorption of 4100 (316 mμ) and 3450 (326 mμ). The nuclear magnetic residence spectra of the two compounds is in agreement with that reported in the literature for similar cinnoline N-oxides.

Example 4

If the procedure described in Eaxmple 1 is repeated using 4-tolualdehyde phenylhydrazone the following compounds are obtained: N-(4-methylbenzylidineamino)isatin, 3-(4-tolyl)cinnoline-4-carboxylic acid, 3-(4-tolyl)cinnoline, a mixture of 3-(4-tolyl)cinnoline 1- and 2-oxides, and 4-chloro-3-(4-tolyl)cinnoline.

Likewise, if the same procedure is repeated with 4-chlorobenzaldehyde 4-tolylhydrazone, the following compounds are obtained: N-(4-chlorobenzylideneamino)-5-methylisatin melting at about 216–217° C., 3-(4-chlorophenyl)-6-methylcinnoline-4-carboxylic acid melting at about 211–212° C., 6-methyl-3-(4-chlorophenyl)cinnoline melting at about 185–186° C., a mixture of 6-methyl-3-(4-chlorophenyl)cinnoline 1- and 2-oxides; and 4-chloro-3-(4-chlorophenyl)-6-methylcinnoline. The starting material, 4-chlorobenzaldehyde 4-tolylhydrazone, is obtained from the reaction of 4-chlorobenzaldehyde with 4-tolylhydrazine and it melts at about 147.5–148.5° C. after crystallization from a mixture of ether and hexane.

Example 5

A mixture of 3.5 parts of 4-chloro-3-phenylcinnoline, 1 part of copper powder, and 20 parts of 2-diethylaminoethylamine is refluxed for 1 hour. The resultant mixture is cooled, diluted with ether, and filtered, and the filtrate is washed with dilute potassium hydroxide. The ether solution is then extracted with dilute hydrochloric acid and the acid extract is made alkaline with dilute potassium hydroxide. The resultant alkaline mixture is extracted with ether and the ether soltuion is separated and dried. Evaporation of the solvent leaves a residue which is crystallized from pentane at 0° C. to give yellow blades of 4-(2-diethylaminoethylamino)-3-phenylcinnoline melting at about 82–84° C. This compound has the following formula

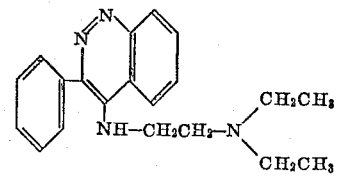

Example 6

The procedure described in Example 5 is repeated using 4 parts of 4-chloro-3-phenylcinnoline, 20 parts of 4-diethylamino-1-methylbutylamine and 1 part of copper powder. The crude product obtained is crystallized twice from pentane to give 4-(4-diethylamino-1-methylbutylamino)-3-phenylcinnoline melting at about 56–59° C. This compound has the following formula

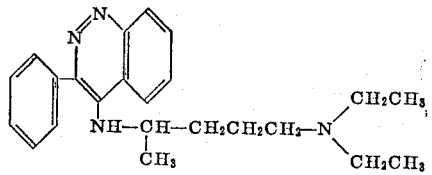

Example 7

A mixture of 4.8 parts of 4-chloro-3-phenylcinnoline and 3.6 parts of 2-dimethylaminoethylamine in 10 parts of dimethyl sulfoxide is heated on a steam bath for 16 hours. The resultant mixture is cooled and diluted with ether and the ether solution is washed with dilute potassium hydroxide solution and then extracted with dilute hydrochloric acid. The acid extract is made alkaline with dilute potassium hydroxide and then extracted with ether. The solvent is evaporated from the dry ether extract to leave a residue which is crystallized from hexane to give white matted needles of 4-(2-dimethylaminoethylamino)-3-phenylcinnoline melting at about 105–107° C.

Example 8

5 parts of 4-chloro-3-(4-chlorophenyl)cinnoline is reacted with 3.6 parts of 3-dimethylaminopropylamine according to the procedure described in Example 7. The product obtained is 4-(3-dimethylaminopropylamino)-3-(4-chlorophenyl)cinnoline melting at about 118–119° C. after recrystallization from a mixture of ether and hexane.

In a similar manner, 4-chloro-3-(4-tolyl)cinnoline reacts with 3-dimethylaminopropylamine to give 4-(3-dimethylaminopropylamine)-3-(4-tolyl)cinnoline.

Similarly, 4-chloro-3-(4-chlorophenyl) - 6-methylcinnoline reacts with 3-dimethylaminopropylamine to give 4-(3-dimethylaminopropylamino) - 3-(4-chlorophenyl)-6-methylcinnoline.

Likewise, 4-chloro-3-(4-methoxyphenyl)cinnoline reacts with 3-dimethylaminopropylamine to give 4-(3-dimethylaminopropylamino) - 3-(4-methoxyphenyl)cinnoline. This compound has the following formula

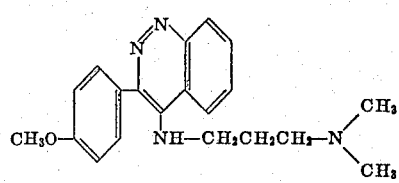

Example 9

The procedure described in Example 5 is repeated using 4 parts of 4-chloro-3-phenylcinnoline and 20 parts of 3-dimethylaminopropylamine. In this case, the crude product is obtained as a yellow glass. This is dissolved in methanol and mixed with a saturated 2-propanol solution of hydrogen chloride. An excess of the hydrogen chloride solution is used. The resultant mixture is diluted with ether to give the product as yellow plates. The material thus obtained is 4-(3-dimethylaminopropylamino) - 3-phenylcinnoline dihydrochloride melting at about 204–206° C.

Example 10

A mixture of 4.8 parts of 4-chloro-3-phenylcinnoline and 10 parts of ethylenediamine in 10 parts of dimethyl sulfoxide is heated on a steam bath for 16 hours. The resultant reaction mixture is cooled and diluted with methylene chloride and then extracted with dilute hydrochloric acid. The acid extract is made alkaline with dilute potassium hydroxide and then extracted with methylene chloride. The solvent is evaporated from the methylene chloride solution to leave a residue which is dissolved in ethanol and mixed with an excess of hydrogen chloride. The hydrogen chloride is added as a saturated solution in 2-propanol. Ether is added to precipitate the salt which is then dissolved in methanol and again precipitated by the addition of ether. The product thus obtained is 4-(2-aminoethylamino) - 3 - phenylcinnoline dihydrochloride melting at about 255–257° C.

Example 11

4.8 parts of 4-chloro-3-phenylcinnoline is reacted with 4 parts of N,N,N'-trimethylethylenediamine according to the procedure described in Example 7. The crude product is dissolved in methanol and reacted with an excess of hydrogen chloride which is added as a saturated solution in 2-propanol. The product is obtained by addition of ether to the solution. The product obtained in this way is 4-[N-(2-dimethylaminoethyl)methylamino]-3 - phenylcinnoline dihydrochloride melting at about 195–197° C.

In the same manner 4-chloro-3-phenylcinnoline is reacted with N,N,N'-trimethyl-1,3-propanediamine to give 4-[N-(3-dimethylaminopropyl)methylamino]-3 - phenylcinnoline dihydrochloride melting at about 215–218° C. The free base of this compound has the following formula

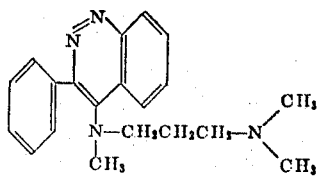

Example 12

A mixture of 4.8 parts of 4-chloro-3-phenylcinnoline and 4.6 parts of 1-(2-aminoethyl)pyrrolidine in 10 parts of dimethyl sulfoxide is heated on a steam bath for 16 hours. The resultant mixture is cooled and diluted with ether. The ether solution is then washed with dilute potassium hydroxide and extracted with dilute hydrochloric acid. The acid extract is made alkaline with dilute potassium hydroxide and then extracted with methylene chloride. The methylene chloride solution is dried and the solvent is evaporated under reduced pressure to leave a residual material which is crystallized from hexane at 0° C. to give yellow prisms of 3-phenyl-4-[2-(1-pyrrolidinyl)ethylamino]cinnoline melting at about 82–84° C. This compound has the following formula

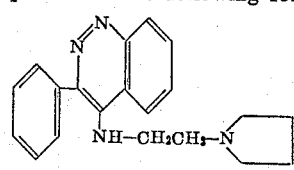

Example 13

The procedure described in Example 7 is repeated using 4.8 parts of 4-chloro-3-phenylcinnoline and 5.1 parts of 2-piperidinoethylamine as the reactants. The crude product is crystallized from a mixture of ether and hexane to give 3-phenyl-4-(2-piperidinoethylamino)cinnoline melting at about 138–140° C.

In a similar manner, if 4-chloro-3-phenylcinnoline is reacted with 1-methyl-4-(2-aminoethyl)piperazine, the product obtained is 3-phenyl-4-[2-(4-methyl-1 - piperazinyl) ethylamino]cinnoline.

Example 14

The procedure described in Example 5 is repeated using 3.2 parts of 4-chloro-3-phenylcinnoline and 10 parts of 4-(3-aminopropyl)morpholine as the reactants. In this case, as the final ether solution is concentrated, a crystalline product separates. This material is separated and recrystallized from a mixture of benzene and heptane to give 4-(3-morpholinopropylamino) - 3 - phenylcinnoline melting at about 145–146° C. This compound has the following formula

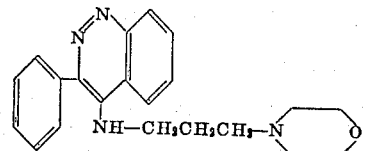

What is claimed is:
1. A compound of the formula

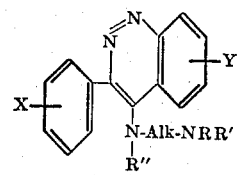

wherein Alk is lower alkylene separating the nitrogens attached thereto by at least 2 carbon atoms; —NRR' is selected from the group consisting of amino, di(lower alkyl)amino, 1-pyrrolidinyl, piperidino, morpholino, and 4-methyl-1-piperazinyl; R'' is selected from the group consisting of hydrogen and methyl; X is selected from the group consisting of hydrogen, methyl, methoxy, and chlorine; and Y is selected from the group consisting of hydrogen and methyl.

2. A compound of the formula

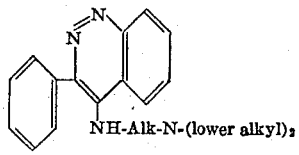

wherein Alk is lower alkylene separating the nitrogens attached thereto by at least 2 carbon atoms.

3. A compound of the formula

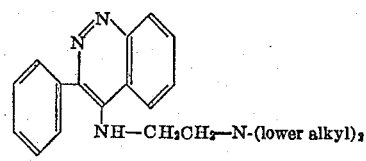

4. 4-(2 - dimethylaminoethylamino) - 3 - phenylcinnoline.
5. 4-(2 - diethylaminoethylamino) - 3 - phenylcinnoline.
6. 4-(3 - dimethylaminopropylamino) - 3 - phenylcinnoline.
7. 4-(3 - dimethylaminopropylamino) - 3 - (4-chlorophenyl)cinnoline.
8. 4-(3 - morpholinopropylamino) - 3 - phenylcinnoline.
9. 4-(2 - piperidinoethylamino) - 3 - phenylcinnoline.

No references cited.

HENRY R. JILES, *Acting Primary Examiner.*

R. J. GALLAGHER, *Assistant Examiner.*